H. F. HANSEN.
ROTARY ENGINE.
APPLICATION FILED FEB. 7, 1918.
1,410,099.
Patented Mar. 21, 1922.
8 SHEETS—SHEET 7.
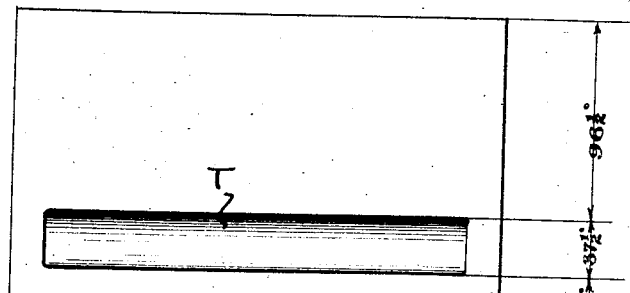
Fig. 8.
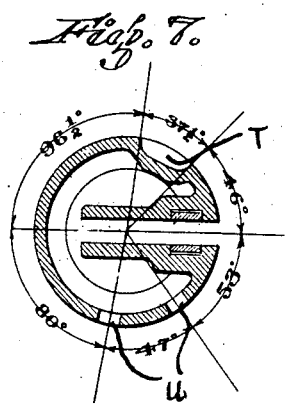
Fig. 7.
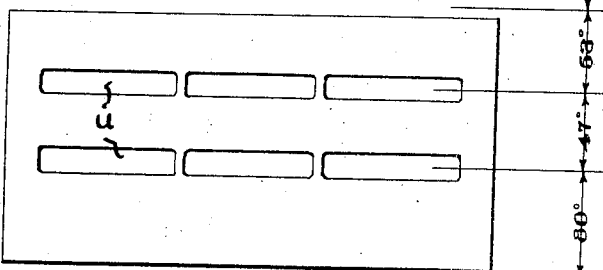
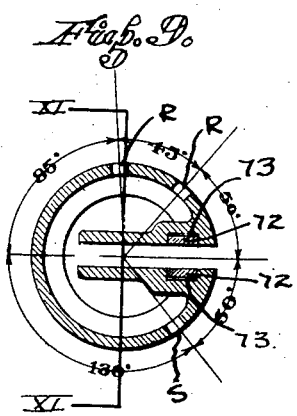
Fig. 9.
Fig. 10.
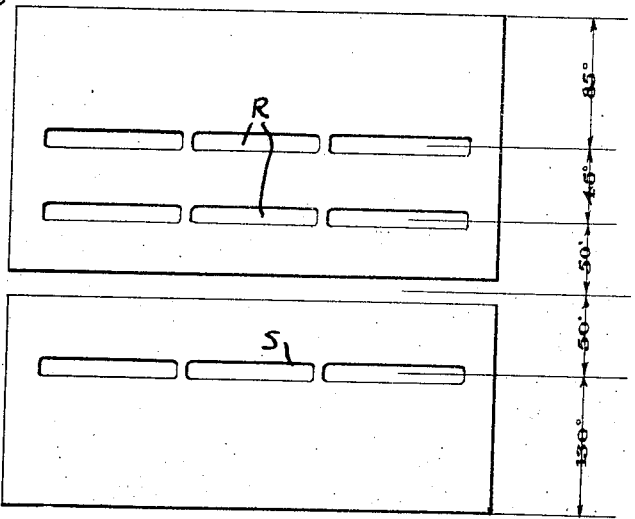
Fig. 11.
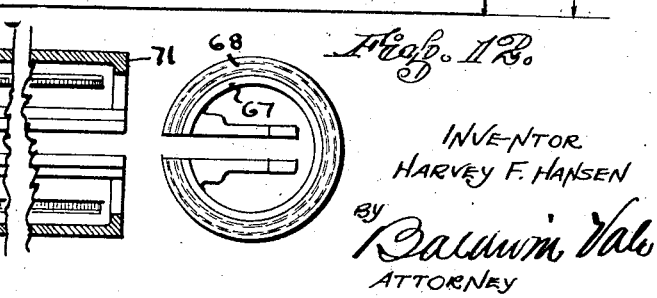
Fig. 12.
INVENTOR
HARVEY F. HANSEN
BY Baldwin Vale
ATTORNEY

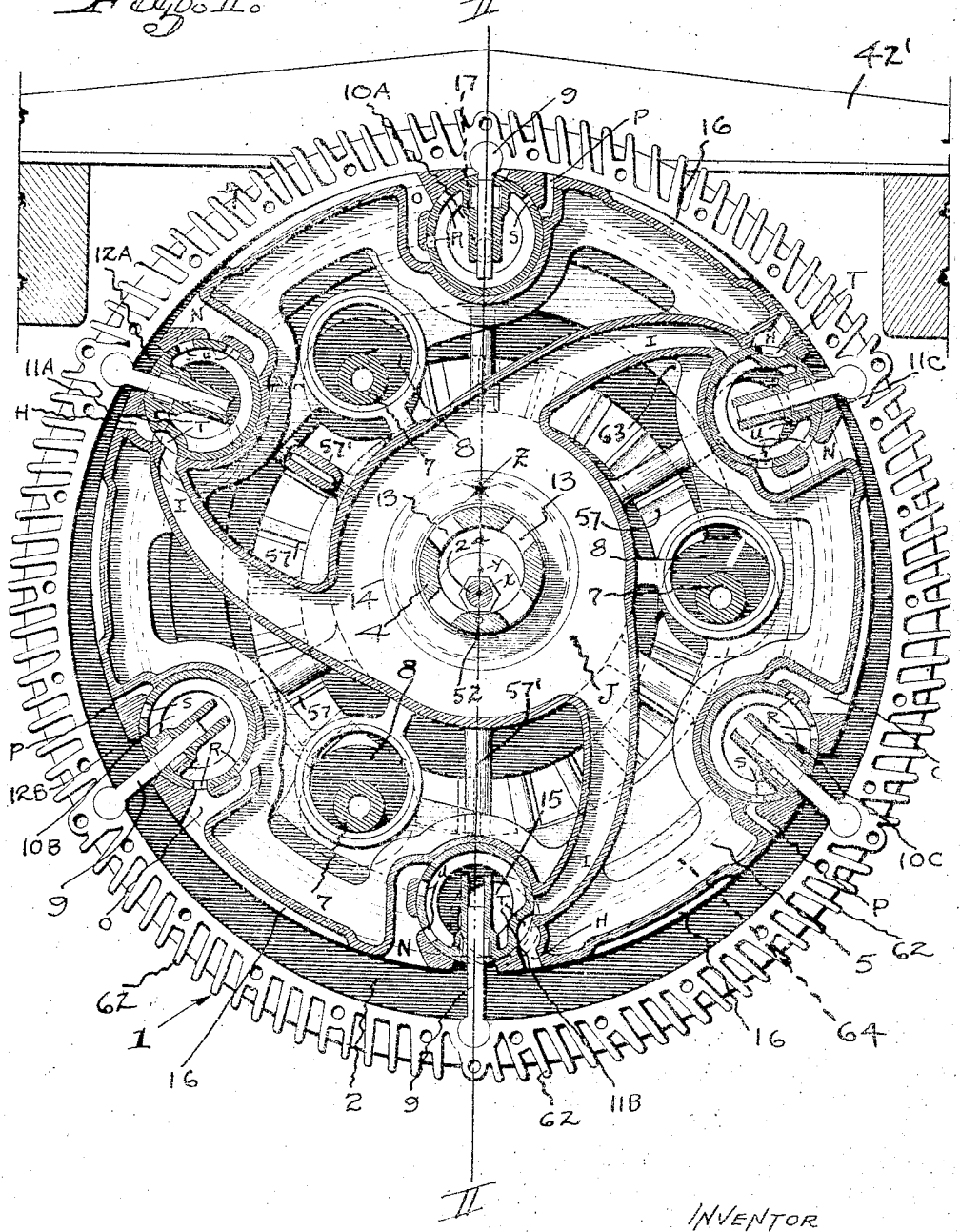

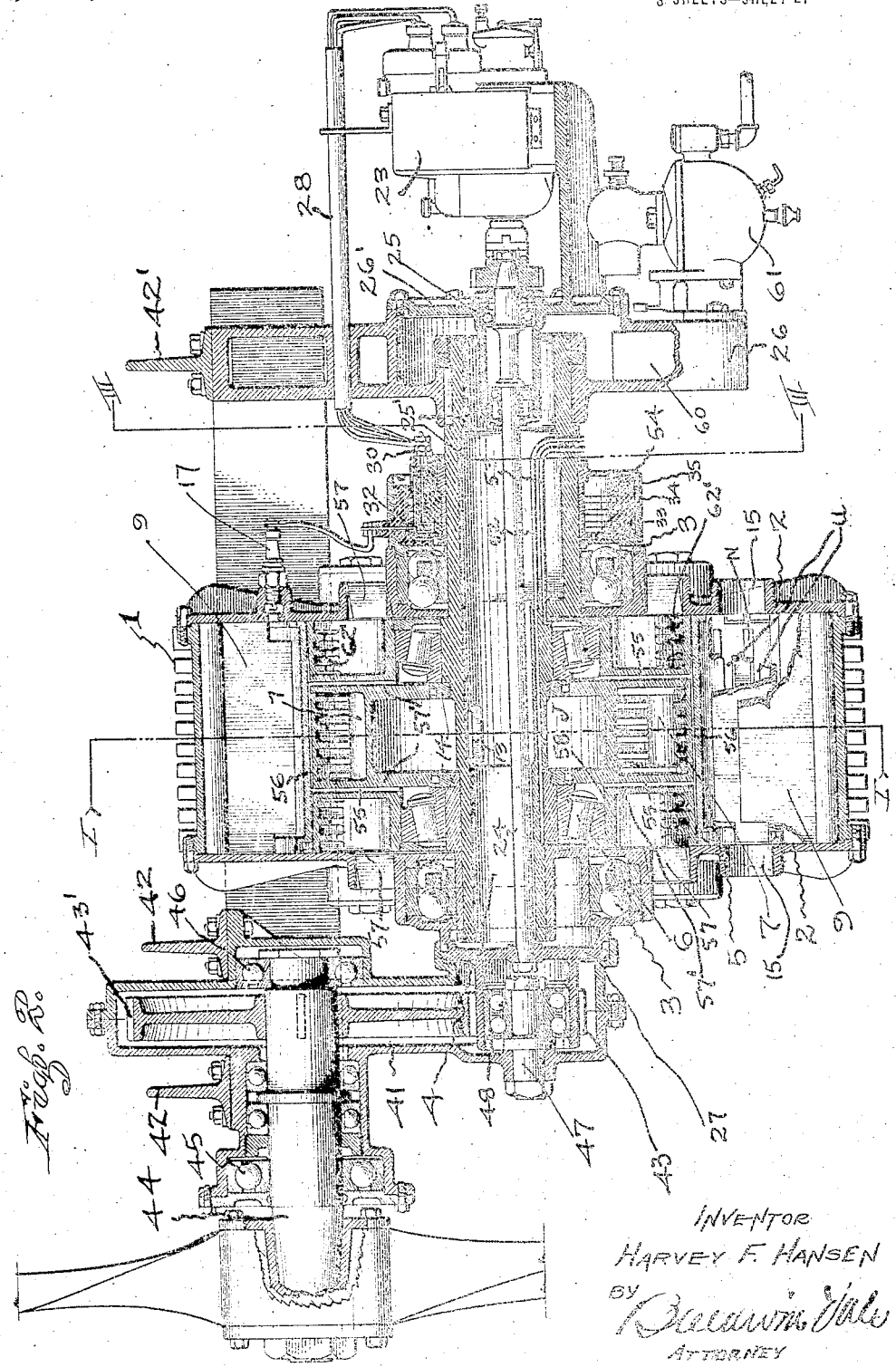

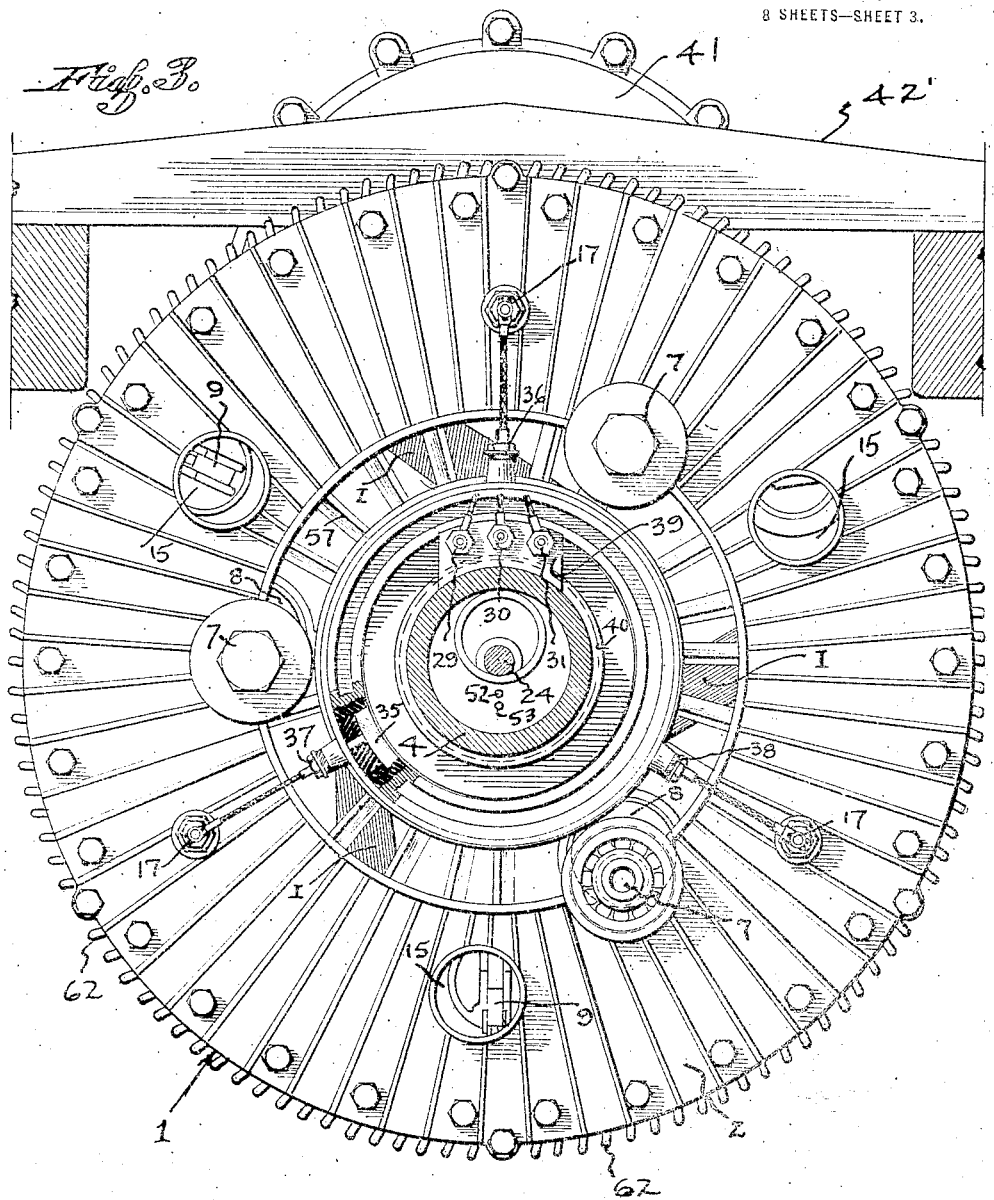

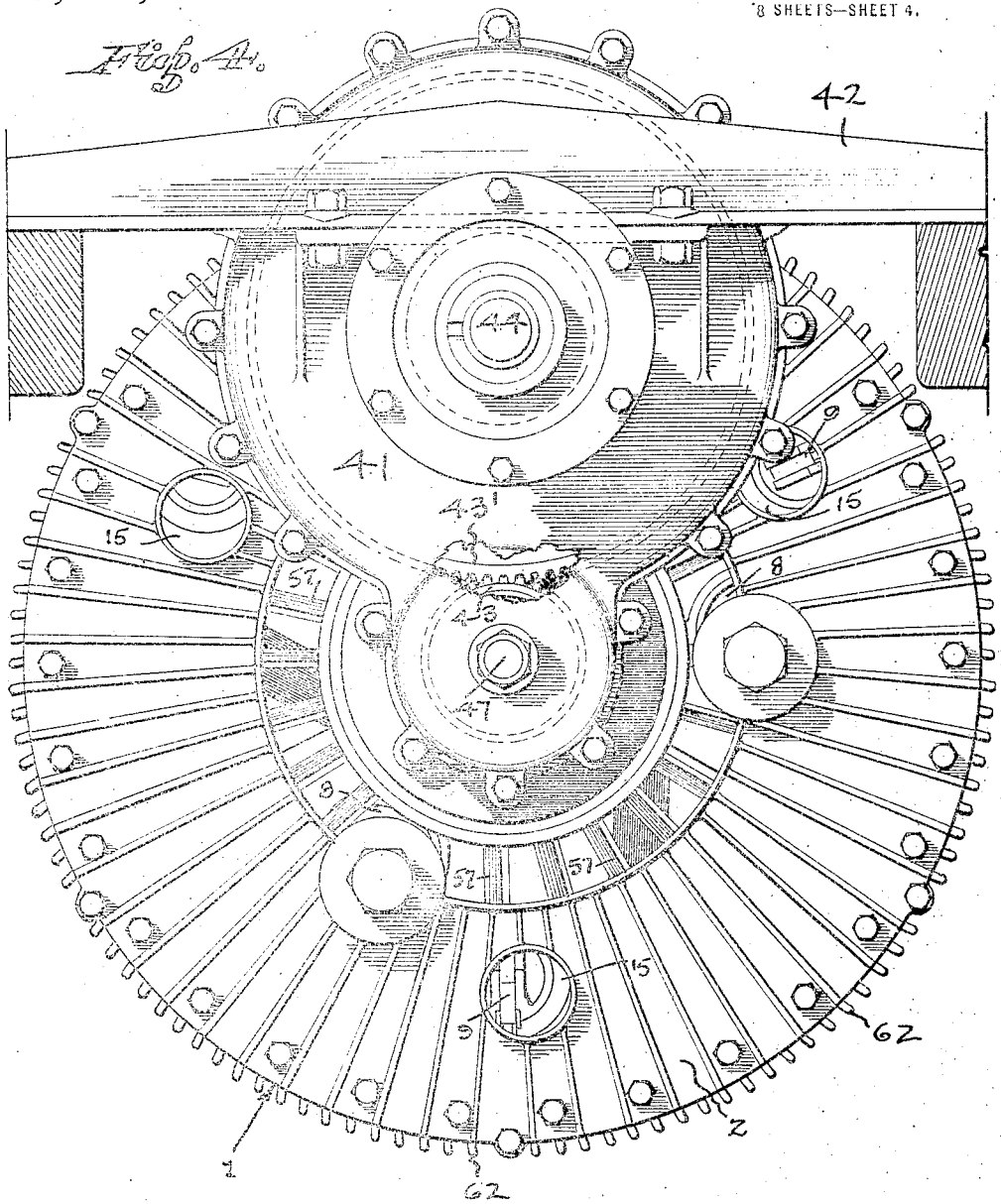

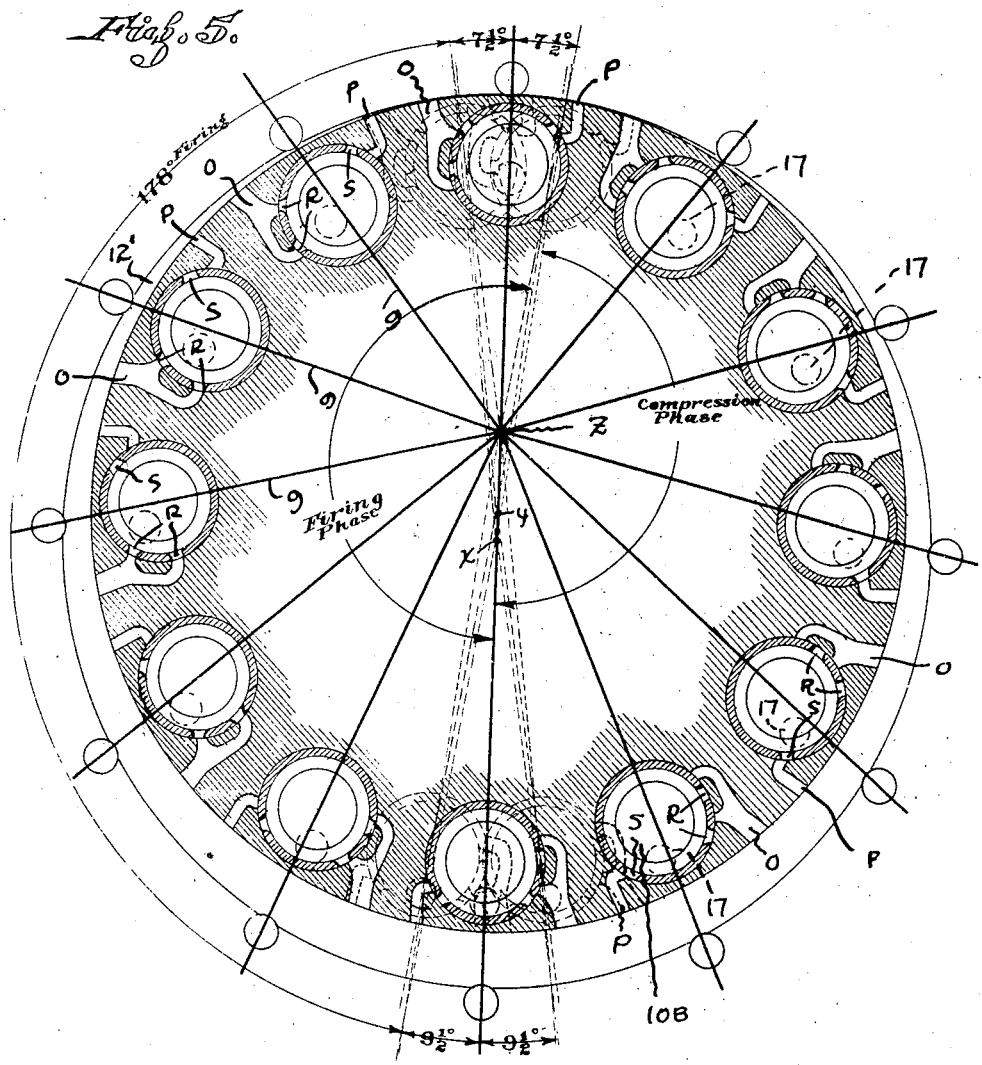

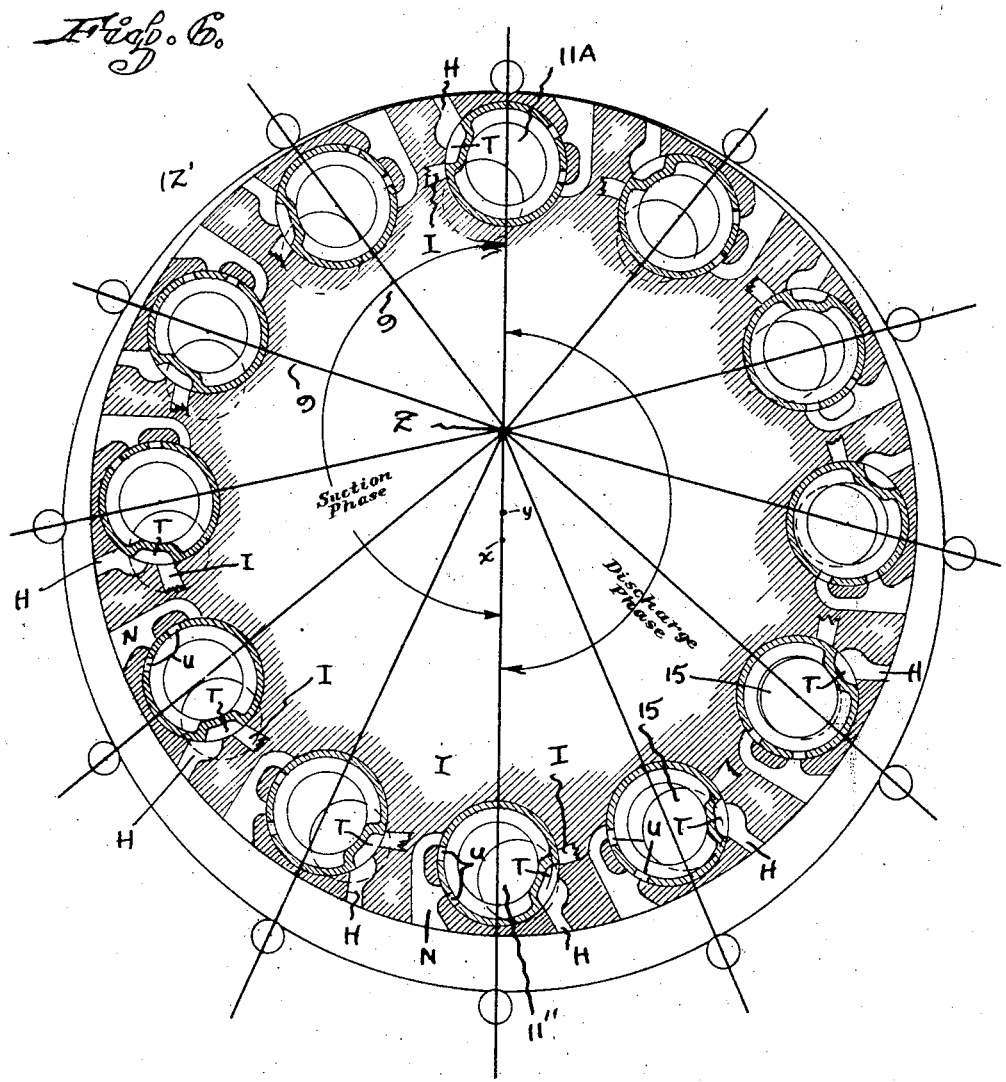

H. F. HANSEN.
ROTARY ENGINE.
APPLICATION FILED FEB. 7, 1918.

1,410,099.

Patented Mar. 21, 1922.
8 SHEETS—SHEET 8.

INVENTOR
HARVEY F. HANSEN
BY Baldwin Vale
ATTORNEY

UNITED STATES PATENT OFFICE.

HARVEY F. HANSEN, OF OAKLAND, CALIFORNIA.

ROTARY ENGINE.

1,410,090.  Specification of Letters Patent.  Patented Mar. 21, 1922.

Application filed February 7, 1918. Serial No. 215,351.

*To all whom it may concern:*

Be it known that I, HARVEY F. HANSEN, a citizen of the United States, and a resident of the city of Oakland, county of Alameda, and State of California, have made a new and useful invention—to wit, Improvements in Rotary Engines; and I do hereby declare the following to be a full, clear, concise, and exact description of the same.

The invention relates particularly to rotary internal combustion engines.

Among the objects of my invention are to produce an engine wherein the four cycles of intake, compression, expansion and exhaustion of gases take place in one unit, one half of the engine performing always the same two cycles, while the other half performs the other two cycles, each always performing the same two cycles; whereby the new fuel gas charge is not taken into a foul chamber, eliminating the disadvantage of residual gases mixing with and having a quenching effect on the new fuel charge.

To construct an engine that is a true rotary engine by eliminating all reciprocating parts, such as cams, poppet valves, springs, connecting rods, pistons, push rods, and the like, with their incidental friction and resistance.

To have the expansion of gases between two rotary members tend to force two centers apart, thus attaining motion.

To have the enclosing case revolve synchronously with the internal revolving member.

To place all the suction spaces that are formed by the enclosing casing and the inner member radial to a common center, whereby all spaces draw their supply of fuel an equal distance from the source of supply, thereby insuring each the advantage of an equal charge of fuel.

To construct an engine that will be light in weight and noiseless in operation.

Other objects and advantages will appear as this description progresses.

In this specification and the annexed drawings, the invention is illustrated in the form considered to be the best, but it is to be understood that the invention is not limited to such form because it may be embodied in other forms, and it is also to be understood that in and by the claims following the description it is desired to cover the invention in whatever form it may be embodied.

In the present engine, the outer casing and the inner rotor both rotate about their axes in the same direction, on different centers, whereby the periphery of the rotor progressively advances to, and recedes from the inner periphery of the outer casing, forming a variable crescent shape space between the two members, that is divided into segmental spaces by transverse vanes pivoted in the outer casings and slidably pivoted in the rotor, whereby these segmental spaces with their variable volumes are made to perform the various cycles in the operation of the engine. The expansion and contraction of these spaces is accomplished by the rotation of the casing and the rotor on different centers in synchronism. A synchronous drive is introduced between these members to relieve the vanes from all strains incidental to the transmission of power, or any other function, except that of sealing the ends of their respective spaces and the oscillation of the valves, as will be hereinafter described. The synchronous driving means is introduced to keep this outer casing and the rotor in synchronous motion, and may be said to act as the fulcrum of the long leverage of the casing and the shorter leverage of the rotor. The function of this construction is to cause these two centers of rotation to tend to pull apart due to the force of the expanding fuel gas, this force operating through the synchronous drive gives motion to both rotary parts around their respective fixed centers. Fuel is drawn into each alternate segmental space through valves operated by the contiguous vanes, by the natural suction created by the expansion of the space. These valves close at the point where the space begins to contract. The fuel charge is then compressed by the contraction of the space and forced into the firing chamber intermediate the alternate suction spaces, being admitted to the firing chamber through valves operated by the canting action of the connecting vanes slidable therein. At the point where the compression space reaches its predetermined point of compression, these valves close and the charge is ignited within the combustion chamber, simultaneously with which the firing chamber oscillates, opening the valves leading into the succeeding segmental space, wherein the gases expand between the peripheries of the rotating members, forcing them apart, and rotating them about their centers as described. At the point of maximum expansion, the burned gases enter the firing chamber of the preceding cycle through the exhaust valves operated by the connecting vanes. These spaces and chambers while revolving around their respective centers perform four distinct cycles, performing two cycles approximately in one half revolution around the center, and the other two cycles in approximately the last half of the revolution.

In the present disclosure, there are six equally spaced oscillating cylindrical chambered sockets into which the vanes advance and recede during rotation, the incidental cant of the vanes oscillating the cylindrical members, which action is taken advantage of to open and close the inlet and exhaust valves of the segmental spaces and the combustion chambers respectively. There are three distinct centers of operation in this engine, the center of the casing, the center of the inner rotary member which is eccentric to the first center, and the third center which is the imaginary point toward which all of the vanes point in their concentric operation with the outer casing, which latter point determines the interplanetary oscillations of the firing chambers and vane sockets in their orbit around the second center which is eccentric to the casing, controlled by the vanes as described. These vanes change their angular position twice during one revolution in relation to the two centers of the outer and inner synchronously revolving members. The imaginary center toward which the vanes always point, is represented by a star in the drawings in Figure 1 and is eccentric to the centers of both the outer and the inner revolving members. Thus this engine attains four cycles by interposing a closed space between each two oscillating socket firing chambers and their connecting vanes, the entire unit having an even number of spaces and half the number of oscillating sockets serving as firing chambers wherein the gases are finally compressed and explosion takes place, and the other half acting as cut-off valves for the suction spaces, and exhaust valves for the exhaust gases.

One half of the segmental spaces serve to take in gas and there compress it into the oscillating firing chamber at its forward end, the other half of the spaces receive the exploded or expanded gas from this same firing chamber and then exhaust it therefrom through exhaust ports through the casing walls. It is manifest that besides the other new and novel features of this engine, is that of having one half of the spaces and chambers performing the first two cycles of intake and compression, the other half number of spaces and chambers performing the other two cycles of the four cycle engine.

The utilization as valves of the oscillating sockets of the vanes in the rotor accomplishes the function in a very direct and effective manner. It is obvious, however, that other forms of valves could be introduced at this point to be operated by the canting of the vanes, or actuated mechanically by timing gears in accordance with common practice in this art.

In the accompanying 8 sheets of drawings,
Figure 1 is an end view in section on the line I—I, Fig. 2.

Fig. 2 is a cross section through center line II—II, Fig. 1.

Fig. 3 is a rear view of the engine showing hollow shaft or central stud in section taken on line III—III, Fig. 2.

Fig. 4 is a front view showing the speed reducing gears through a broken away section of their surrounding case.

Fig. 5 is a diagrammatic illustration of one oscillating firing chamber, showing the positions of its two valves performing their two phases during one revolution.

Fig. 6 is a diagramamtic illustration of the intake and exhaust valves in one oscillating vane socket, showing the position of its two valves performing their two phases during one revolution.

Fig. 7 is an end view of an oscillating vane socket having intake and exhaust valve passages therein.

Fig. 8 is a flattened diagrammatic view of the circumference of same.

Fig. 9 is an end view of the oscillating firing chamber.

Fig. 10 is a diagrammatic view of the circumference of the same.

Fig. 11 is a sectional view of Fig. 9 on line XI—XI, with separated details of the packing rings showing how end packing or sealing of the vane sockets is attained.

Fig. 12 is an end elevation of the same with packing rings assembled.

Similar numbers and letters refer to similar parts throughout the several views.

Figure 13:
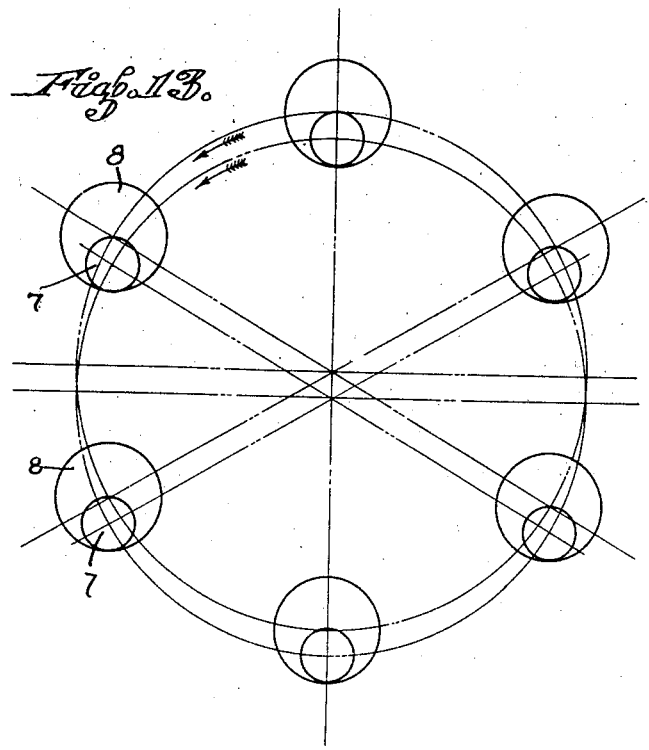
Fig. 13 is a diagrammatic layout of the synchronous driving means by which synchronism between the outer casing and the inner rotor is attained.
Figure 14:
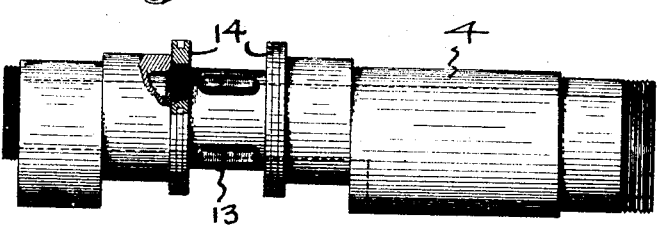
Fig. 14 is a side elevation of the hollow supporting stud.

In detail the construction illustrated in the drawings includes: a rotatable casing 1 having side plates or flanges 2, with concentric bearings 3 therein, which in turn are supported eccentrically on the hollow shaft or central stud 4. Enclosed within this outer revolving casing is the inner revolving rotor 5, eccentric to the outer casing and concentric to the hollow stud 4, upon which it is journaled on ball or the roller bearings 6.

The rotor and outer casing are caused to revolve in synchronism around this hollow fixed stud 4 by any suitable means, the preferred means as shown, are the round studs of shafts 7, that are supported in radial ball bearings in the side plates 2. These bearings are symmetrically located in a circle which is concentric to the center bearings of the outer casing. These studs 7 extend between the two side plates 2, through the holes 8 through the rotor 5. The diameter of these openings 8 is the diameter of the round driving studs 7, plus twice the distance between the centers of eccentricity of the casing and rotor. These openings are symmetrically located in a circle concentric to the center of the rotor 5. The circle of rotation of the centers of the driving studs in the side flanges 2, and the circle of rotation of the centers of the openings 8 in the rotor, are both of equal radius, each turning on its own individual center in eccentric relation to each other. The cylindrical openings 8 have to be of a larger diameter to allow the casing and rotor to rotate in synchronism without having the driving studs 7 bind in the openings 8. Figure 13 is a diagrammatic layout of the movement of one driving stud carried around in its different positions during one revolution, showing the constant traveling contact between the studs and the peripheries of the openings 8. Any number of these driving studs may be used to couple the two revolving members together, preventing back lash of the parts, and furnishing positive and synchronous driving and timing between the casing and the rotor.

Referring to the diagrammatic layouts in Fig. 5 and Fig. 6, the center lines of all the vanes sliding in their oscillating joints always point to an imaginary center Z, which is above the centers X of the casing and Y of the rotor, regardless of their position around the circumference of the revolving parts. The vanes 9 reverse their angular positions with regard to a vertical line through the centers X, Y, Z, once during the first half of the revolution. At the end of the first half revolution the center line of a given vane points again radially straight through the centers X, Y and Z and is in the same alinement it had in the start of this first half revolution. The second half revolution restoring each vane to its original position with respect to said three centers. Therefore, the oscillating socket chambers turn in a direction that is in the lead of the rotation of the rotor 5, and during the last half of the revolution they turn in a direction inverse to the first movement and a counter direction to the lead of the rotor, resulting in the desirable early opening of the intake valves and late closing of the exhaust valves. The oscillation of these two sets of even numbers of vane sockets, each having two movements past said vertical line, causes these oscillating chambers to perform two distinct cycles in one revolution. Having an even number of these oscillating vane sockets and an even number of firing chambers, alternating around and near the outer periphery of the rotor 5, with the vanes 9 sliding therein, divides the crescent shape space formed between the eccentrically revolving case and rotor into as many segmental spaces as there are vanes. Each segmental space increases in size from a minimum to a maximum during the first half revolution and then decreases from a maximum to a minimum during the last half of the revolution. Fig. 1 shows the oscillating compression and explosion chambers within the vane sockets and marked $10^A$, $10^B$, $10^C$. The chamber $10^A$ is at the top where the periphery of the rotor 5 and the periphery of the casing 1 come in close contact. Alternately placed between the last numbered oscillating chambers are the oscillating intake and exhaust valve sockets marked $11^A$, $11^B$ and $11^C$. The chamber $10^A$ at the top is in the firing position with all valve ports closed. These compression and explosion chambers $10^A$, $10^B$ and $10^C$ have the ports R and S through their outer shells on each side of the sliding vanes 9, these ports register with another pair of ports, lettered O and P, which are located in the walls of the rotor 5. The oscillation of the vane sockets alternately establish communications through the ports R—S and O—P, while the engine is revolving around the central stud 4.

Suitable ignition is provided, such as the magneto 23 which is directly driven at engine speed by the shaft 24, supported in bearings 25 and 25', that are mounted in a cylindrical projection of the end plate 26'. The shaft 24 is keyed concentrically in the cap 27 of the bearing 3. The secondary wires from the magneto pass through the rear engine frame 26, in an insulation tube 28, and connect to the three terminals 29, 30 and 31, shown in Fig. 3. These connect to three separate brushes in holders, the center one 30 is shown in cross section in Fig. 2. Each one of these brushes 32 run in contact with one of the three continuous collector rings 33, 34 and 35, which are insulated from the engine parts as shown in cross section in Fig. 2, this insulation is inserted in the bearing cap 54 of the ball bearing 3 in the rear side plate 2 and revolves with the casing.

The current is taken from the continuous rings 33, 34 and 35, by the insulated terminals 36, 37 and 38, shown in Fig. 3, 37 is shown in cross section. The three terminals 29, 30 and 31 that connect to these separate brushes are set into an insulated block 39 fastened to the ring 40 having a flange with a section cut out into which the block 39 fits, thus enclosing the various parts. This wide ring 40 does not turn and is fastened to the hollow stud 4. Each terminal 36, 37 and 38 is connected to the three separate spark plugs 17, as shown in Fig. 3, that in turn fire the charges of gas in the oscillating firing chambers 10^A, 10^B and 10^C, as they come into the firing cycle in synchronism with which the ignition is timed.

This engine operates substantially as follows (see Figs. 1 and 6) beginning with the valve socket 11^A at the top in Fig. 6, in which the valve T is about to open between the manifold I and the outlet II, opening the manifold to the segmental chamber 12^A, that is just coming into the suction cycle, which is the horn of the crescent shape space between the rotor and the casing. The increasing volume, as the space enlarges, creates a suction through the passages H—I and the valve T through the ports 13, through the manifold I—J, sealed to the shaft 4 by the interposed packing rings 14, through the hollow shaft 4, through the enclosed space 60, to which the conventional carbureter 61 is attached, and through which the suction cycle creates a passage of air that is impregnated with gasoline or other vaporizing fuel, that is drawn into the space 12^A for half a revolution, at which point the valve I—T—II closes (see at bottom of Fig. 6) completing the suction cycle.

The manifold extensions I extend tangentially from a central manifold J and are substantially parabolic in curvature, to take full advantage of centrifugal force to increase the suction on the carbureter 61 and to force the fuel mixture into the suction chamber at the highest possible pressure to increase the volume of fuel and consequently the volume of expansion when the fuel is ignited. At this point the compression cycle starts. The firing chamber 10^B preceding has been oscillated to open the valves P—S (see Fig. 5). As the segmental chamber 12 contracts, the fuel stored therein is compressed into the chamber 10^B until the revolution is completed again at the top, just preceding which the valves P—S close, confining the charge in the firing chamber 10^B under compression due to the displacement at the moment that the rotor and the casing approximate contact.

Ignition current from the magneto 23 delivered to the spark plugs 17 can be timed with suitable advancing and retarding means in accordance with common practice, to produce the spark within the firing chamber at any desirable point preceding or past the center, igniting the compressed fuel mixture within the firing chamber 10^B, which in its advance is oscillated by the cant of the vane 9 sliding therein, to open the valves R—O liberating the expanding products of combustion into the gradually expanding chamber 12, wherein the internal pressure of the expanding gases forces the rotor and the casing apart, in the only direction in which they can move under control of the interposed synchronous drive, around the operating center of the casing, which is fixed and causes the casing to revolve therearound under the influence of the gases expanding between the casing, the rotor and the side plates, between the vanes 9 at the opposite ends of the expansion chamber 12. This expansion of gases continues until the expansion cycle is completed during one half revolution, which brings the firing chamber 11' (see Fig. 6) to the median position at which point the sliding vane oscillates the firing chamber to open the ports N—U, liberating the burned gases from the chamber 12 through the hollow center of the vane socket 11 partially opened to the exhaust port 15 through the side plates 2, with which it continues in registry reaching its maximum opening at about fifty degrees from the vertical, at which point the registering opening begins to diminish in area, but never completely closes. These ports 15 are preferably placed on both sides of the engine through both plates 2, which gets rid of the exhaust gases with the least possible back pressure and insures a cooling rush of air through the exhaust space 11. A further advantage of this double-ended exhaust is that divides the volume, which diminishes the incidental noise, which is further diminished by the fact that the exhaust ports are not fully opened at the time the exhaust gases are liberated, which results in a graduated liberation from the space 11, which in connection with the rotation of the casing from which the exhaust is liberated reduces the incidental noise to the minimum.

To prevent "squeeze" of any residual gases due to leakage or other causes that may be between the vanes within a segmental space at the period that the rotor is approaching contact with the casing at the top, I provide the peripheral recesses 16 to increase the volume and relieve the pressure until such residual gases or fuel can be absorbed in the next cycle.

The succeeding segmental spaces and their associated cooperative mechanism in the series, each pass through the same cycles of operation just described, all contributing their quota of power to the casing 1, the rotation of which may be utilized in various ways. In the present instance the housing 27, that is directly fixed to the hub of the casing and covers one of the bearings 3, provides a convenient point at which to couple the engine to a load. In the present instance this housing is provided with a driving pinion 43 enmeshed with the driving gear 43' fixed on the shaft 44 mounted in suitable bearings 45 and 46. These gears and associated mechanisms are suitably encased in the housing 41. As it may be desirable to run this engine at high speed to generate the maximum power with the minimum weight, this gearing provides a convenient arrangement for speed reduction. For aeroplane practice, the propeller may be fixed on the shaft 44 in the conventional manner. The housing 41 which also supports one end of the engine shaft on the stud 47 fixed thereon having the bearing 48, and is bolted to the cross strut 42 in any suitable mounting, such as 21. The opposite end 26 of the engine support is likewise bolted to a similar strut 42′. The mounting or support for the engine will vary with circumstances incidental to its installation, those shown relating particularly to air plane practice.

To accomplish cooling I interpose an opening between the side plates 2 and their central hubs 3 that is bridged across by the oblique vanes 57, which acting as blowers during rotation force a blast of air through the center of the engine with great cooling effect, particularly upon the interior of the rotor which is an annular channel shaped structure with its interior surfaces exposed to this transverse blast of air, with only a single thickness of metal intervening between the gases during the firing cycle and the cooling blast of air. The exterior of the casing and the plate 2 may be provided with cooling vanes or fins such as 62.

To increase this cooling effect, the interior of the rotor may be provided with cooling vanes, such as 62′.

Lateral sealing or packing between the side plates 2 and the sides 63 of the rotor is accomplished by the packing ring sectors 64 shown in dotted lines in Fig. 1, and in cross section in Fig. 2, fitting similarly shaped grooves formed in the sides 63 of the rotor and forced outward by interposed springs, the faces of the rings bearing against the side of the plates 2.

The ends of the vane sockets are similarly packed (see Figs. 11 and 12) by the packing rings 65, set into a recess 66 and surrounding the neck 67. The ring 65 has a flat face 68 to bear against the side plate 2 and the tapered opposite face 69 bearing against a similarly tapered face on the ring 70 seated within the recess 66, whereby the normal contraction of the ring 65 causes it to rise outward on the inclined face of the ring 70, giving the ring 65 a lateral displacement to create a lateral pressure which forces the face 68 against the plate 2 on one side and the end 71 of the socket against the plate 2 on the opposite side of the engine, to prevent leakage past the end of the socket. The rings 65 and 70 are divided to pass the vanes 9 extending thereinto. The sides of the vanes are packed by the packing blocks 72—72 (see Fig. 9) recessed in the contiguous surface of the socket and adapted to be forced outward by interposed springs 73. Various modifications of these packings may be resorted to to hermetically seal the segmental spaces between the rotor and the casing, as well as the oscillating joints and vanes.

Lubrication of rotary engines presents few difficulties owing to the distributive effect of centrifugal force, the utilization of which may be made to carry to the periphery lubricant liberated near the center. For this purpose, I introduce oil through the tubes 52 and 53, by any suitable means, which lead to channels formed in the shaft 4 and having bypasses leading to the bearings 6 (see Fig. 2) through which the lubricant circulates and escapes through the bypasses 55—55 through a transverse groove 56 beneath the several vane sockets. These latter bypasses extending through the spokes 57 joining the periphery of the rotor to its hub 58 within which the bearings 6 are placed. The oil escapes naturally from around the oscillating vane sockets into the space between the rotor and the casing, wherein it collects upon the vanes 9 lubricating the same in their sliding motion in the sockets until it works through the exhaust port 15 and is discharged from the engine. The other bearings being more or less external are easily lubricated in any conventional manner.

Having thus described my invention, what I claim and desire to secure by Letters Patent is:

1. A rotary engine including a revolving casing and a rotor revoluble in the same direction on different centers; a synchronous drive between said casing and said rotor; a valve; a vane pivoted in said casing and slidable in said valve; and means for introducing a displacing medium between said casing and said rotor through said valve.

2. A rotary engine including a revolving casing and a rotor revoluble in the same direction on different centers; a synchronous drive between said casing and said rotor; an oscillating valve in said rotor; a vane pivoted in said casing and slidable in said valve.

3. A rotary engine including a revolving casing and a rotor revoluble in the same direction on different centers; a vane pivotal in both said casing and said rotor; a valve between the space between said casing and rotor and the interior of said vane pivot.

4. A rotary engine comprising a revolving casing and a rotor revoluble on different centers; vanes pivoted in said casing and slidable in said rotor; valves in said rotor operated by said vanes; means for introducing a displacing medium into the space between said casing and rotor through said valves.

5. A rotary engine including a casing and a rotor revoluble on different centers;

a vane pivotally interposed between said casing and rotor; and a valve communicating between the spaces on opposite sides of said vane and operated by said vane.

6. A rotory engine including a casing and a rotor revolving on different centers; vanes pivotally interposed between said casing and rotor; and oscillating valves communicating between the spaces on opposite sides of said vanes and operated by said vanes; and inlet and outlet valves in said spaces.

7. A rotary engine including a casing and a rotor revoluble on different centers; vanes pivotally interposed between said casing and rotor; oscillating valves communicating between the spaces on opposite sides of each alternate vane; inlet and exhaust valves on each side respectively of the vanes intermediate each said alternate vanes, all of said valves operated by their respective vanes.

8. A rotary engine including a casing and a rotor revoluble on different centers; pivotal vanes slidable in hollow oscillating sockets and interposed between said casing and rotor; valves communicating between the spaces on opposite sides of each alternate vane through said sockets; inlet and exhaust valves on each side respectively of the vanes intermediate each said alternate vanes, said exhaust valves opening into their respective sockets; and means for introducing a displacing medium through said inlet valve to the space between said casing and rotor and and the adjacent vanes.

9. A rotary engine including a casing and a rotor revoluble on different centers; an oscillatable vane interposed between said casing and said rotor; a firing chamber revolving in an orbit about said centers and intermittently communicating with the space between said casing and rotor on opposite sides of said vane.

10. A rotary engine including a casing and a rotor revoluble on different centers; an oscillat[ing] vane interposed between said casing and rotor; a synchronous drive means interposed between said casing and rotor; and a firing chamber revolving in an orbit about said centers and intermittently communicating with the space between said casing and rotor on opposite sides of said vane.

11. A rotary engine including a casing and a rotor revoluble on different centers; an oscillating firing chamber having valves therein; a pivotal vane slidable into said chamber and interposed between said casing and rotor.

12. A rotary engine including a casing and a rotor revoluble on different centers; oscillating firing chambers; oscillating exhaust chambers; vanes interposed between said casing and rotor and slidable in said chambers; valves in said firing chambers communicating with the spaces on opposite sides of the vanes slidable therein; and valves in said exhaust chambers communicating with the spaces on opposite sides of the vanes slidable therein.

13. A rotory engine including a casing and a rotor revoluble on different centers; vanes interposed between said casing and rotor dividing the space between said casing and rotor into segmental spaces; firing chambers between alternate vanes having valves communicating with the said spaces on opposite sides of said alternate vanes; and inlet and exhaust valves communicating respectively with the said spaces on opposite sides of said vanes intermediate said alternate vanes.

14. A rotary engine including a casing and a rotor revoluble on different centers; vanes interposed between said casing and rotor; firing chambers revolving in an orbit around said centers and communicating with the spaces on opposite sides of alternate said vanes; inlet and exhaust valves communicating respectively with the spaces on opposite sides of said vanes intermediate said alternate vanes; means for introducing fuel through said inlet valves; and ignition means in each of said firing chambers.

15. A rotary engine including a casing and a rotor revoluble on different centers; vanes dividing the space between said casing and rotor into segmental spaces; a firing chamber revolving in an orbit around said centers; means for introducing fuel into alternate said segmental spaces; means for transfering said fuel into said firing chamber and igniting it, and transferring it to the succeeding segmental chamber and exhausting it therefrom.

16. A rotary engine including a casing and a rotor revoluble on different centers; means dividing the space between said casing and rotor into segmental chambers; firing chambers between said alternate segmental spaces; means for introducing fuel into one of said segmental spaces and compressing it into and firing it within the adjacent firing chamber; and means for transferring and expanding it in the succeeding segmental chamber and exhausting it therefrom during one revolution of said casing.

17. A rotary engine including a casing and a rotor revoluble on different centers; synchronous driving means interposed between said casing and rotor; vanes interposed between said rotor and casing dividing the intervening space into segmental spaces; firing chambers between alternate segmental spaces; means for introducing fuel into alternate said spaces and compressing it onto and firing it within said firing chambers; and means for transferring and expanding it in the succeeding segmental space and exhausting it therefrom and repeating the said four cycle sequence of operation seriatim around said centers.

18. A rotary engine including a casing and a rotor revoluble on different centers; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valves in said sockets communicating with the adjacent space on one side of the vanes therein and the interior of said sockets; and intake valves in said sockets and communicating with the space on the opposite side of the vanes in said sockets; and means for introducing ignitable fuel through said inlet valves; and means for igniting said fuel in said firing chambers.

19. A rotary engine including a casing and a rotor revoluble on different centers; synchronous driving means interposed between said casing and rotor; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valve in said sockets communicating with the adjacent space on one side of the vanes therein and the interior of said sockets; and intake valves in said sockets and communicating with the space on the opposite side of the vanes in said sockets; and means for introducing ignitable fuel through said inlet valves; and means for igniting said fuel in said firing chambers.

20. A rotary engine including a casing and a rotor revoluble on different centers; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valves in said sockets communicating with the adjacent space on one side of the vanes therein and the interior of said sockets; and intake valves in said sockets and communicating with the space on the opposite side of the vanes in said sockets; a hollow shaft enclosing the said center of said rotor; a manifold communicating with said hollow shaft and having extensions to said intake valves; and means for introducing fuel into said hollow shaft.

21. A rotary engine having a revoluble concentric annular casing with an open center around a hub; an annular rotor within said casing and revoluble on a different center; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valves in said sockets communicating with the adjacent space, on one side of the vanes therein and the interior of said sockets; and intake valves in said sockets and communicating with the space on the opposite side of the vanes in said sockets; means for introducing ignitable fuel through said inlet valves; and means for igniting said fuel in said firing chambers.

22. A rotary engine having a revoluble concentric annular casing with an open center around a hub; an annular rotor within said casing and revoluble on a different center; and synchronous driving means interposed between said casing and rotor; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valves in said sockets communicating with the adjacent space on one side of the vanes therein and the interior of said sockets; and intake valves in said sockets and communicating with the space on the opposite side of the vanes in said sockets; means for introducing ignitable fuel through said inlet valves; and means for igniting said fuel in said firing chambers.

23. A rotary engine including a casing and a rotor revoluble on different centers; synchronous driving means interposed between said casing and rotor; oscillating vane sockets in said rotor having openings registering with ports through said casing; vanes pivoted in said casing and slidable in said sockets; oscillating firing chambers in said rotor intermediate said vane sockets; vanes pivoted in said casing and slidable in said chambers; valves in said chambers communicating with the spaces on opposite sides of the vanes in said chambers; exhaust valves in said sockets communicating with the adjacent space on one side of the vanes therein and the interior of said socket; and intake valves in said sockets and communicating with the space on the opposite side of the vanes in said sockets; a hollow shaft enclosing the said center of said rotor; a manifold communicating with said hollow shaft and having extensions to said intake valves; and means for introducing fuel into said hollow shaft.

24. A rotary engine including a casing and a rotor synchronously revoluble in the same direction on different centers; vanes interposed between said casing and rotor; an oscillatable firing chamber engaging said vanes; means for introducing fuel into said firing chamber; ignition means in said firing chamber; and means whereby said engine performs four cycles of operation during one revolution.

In testimony whereof, I have hereunto set my hand at San Francisco, California, this 26th day of January, 1918.

HARVEY F. HANSEN.

In presence of—
LINCOLN V. JOHNSON,
A. J. HENRY.